(12) United States Patent
Kawate

(10) Patent No.: US 11,175,659 B2
(45) Date of Patent: Nov. 16, 2021

(54) DRIVING ASSISTANCE SYSTEM AND DISPLAY DEVICE

(71) Applicant: NIPPON SEIKI CO., LTD., Niigata (JP)

(72) Inventor: Tamito Kawate, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 121 days.

(21) Appl. No.: 16/087,969

(22) PCT Filed: Mar. 9, 2017

(86) PCT No.: PCT/JP2017/009388
§ 371 (c)(1),
(2) Date: Sep. 24, 2018

(87) PCT Pub. No.: WO2017/169608
PCT Pub. Date: Oct. 5, 2017

(65) Prior Publication Data
US 2019/0094856 A1 Mar. 28, 2019

(30) Foreign Application Priority Data
Mar. 28, 2016 (JP) .............................. JP2016-063060

(51) Int. Cl.
*G05D 1/00* (2006.01)
*B60W 50/14* (2020.01)
(Continued)

(52) U.S. Cl.
CPC .......... *G05D 1/0061* (2013.01); *B60K 35/00* (2013.01); *B60R 11/02* (2013.01); *B60R 21/00* (2013.01);
(Continued)

(58) Field of Classification Search
CPC .................................................. G05D 1/0061
See application file for complete search history.

(56) References Cited

U.S. PATENT DOCUMENTS 2,570,905 A * 10/1951 Young .................. G05D 1/0061
244/179
3,348,643 A * 10/1967 Townsend ............... F16H 47/06
192/3.58
(Continued)

FOREIGN PATENT DOCUMENTS

| DE | 19743024 A1 | 4/1999 |
|----|----|----|
| DE | 102008019461 A1 | 10/2009 |

(Continued)

OTHER PUBLICATIONS

Google English machine translation for Japanese Patent Application Pub No. JP 2014-108771 A to Kawagoe (downloaded on Mar. 18, 2020).*

(Continued)

*Primary Examiner* — Jean Paul Cass
(74) *Attorney, Agent, or Firm* — McDermott Will & Emery LLP

(57) ABSTRACT

The present invention contributes to safe driving by facilitating recognition of the timing at which driving assistance is switched. In the present invention, an advance notice display unit obtains information relating to vehicle driving assistance to be disabled and displays a advance notice image for giving advance notice of disabling of the driving assistance on the basis of said information, and a completion display unit obtains information relating to the detection of a disabling operation required for disabling the driving assistance and/or the completion of disabling of the driving assistance and displays a completion image for giving notice of the completion of disabling of the driving assistance or (Continued)

the completion of the disabling operation on the basis of said information.

5 Claims, 8 Drawing Sheets

(51) Int. Cl.
| | |
|---|---|
| *B60K 35/00* | (2006.01) |
| *B60R 11/02* | (2006.01) |
| *G08G 1/16* | (2006.01) |
| *B60R 21/00* | (2006.01) |
| *B60W 50/08* | (2020.01) |
| *B60R 1/00* | (2006.01) |
| *B60W 10/18* | (2012.01) |
| *B60W 10/20* | (2006.01) |
| *B60W 30/06* | (2006.01) |
| *B60W 30/18* | (2012.01) |

(52) U.S. Cl.
CPC .......... *B60W 50/082* (2013.01); *B60W 50/14* (2013.01); *G08G 1/16* (2013.01); *B60R 1/00* (2013.01); *B60W 10/18* (2013.01); *B60W 10/20* (2013.01); *B60W 30/06* (2013.01); *B60W 30/18163* (2013.01); *B60W 2050/146* (2013.01); *B60W 2554/00* (2020.02); *B60W 2900/00* (2013.01); *G05D 1/0088* (2013.01); *G05D 2201/0213* (2013.01)

(56) References Cited

U.S. PATENT DOCUMENTS

| | | | | |
|---|---|---|---|---|
| 6,226,570 | B1 | 5/2001 | Hahn | |
| 8,618,922 | B2* | 12/2013 | Debouk | B60W 50/038 |
| | | | | 340/439 |
| 9,123,186 | B2* | 9/2015 | Ricci | A61B 5/7405 |
| 9,473,421 | B1* | 10/2016 | Basil | G06F 13/14 |
| 9,637,050 | B2* | 5/2017 | Miura | G08G 1/04 |
| 9,650,019 | B2* | 5/2017 | Weston | B60S 3/04 |
| 9,682,689 | B2* | 6/2017 | Parker | B60T 8/171 |
| 9,772,626 | B2 | 9/2017 | Bendewald et al. | |
| 10,031,523 | B2* | 7/2018 | Ricci | B60R 25/24 |
| 10,139,829 | B1* | 11/2018 | Mariet | G08G 1/09626 |
| D864,993 | S * | 10/2019 | Kim | D14/488 |
| 10,640,108 | B2* | 5/2020 | Katou | H04W 4/023 |
| 2003/0236601 | A1* | 12/2003 | McLeod | B60L 3/0046 |
| | | | | 701/31.4 |
| 2008/0046145 | A1* | 2/2008 | Weaver | B60T 7/22 |
| | | | | 701/41 |
| 2015/0094914 | A1* | 4/2015 | Abreu | B60H 1/00742 |
| | | | | 701/41 |
| 2015/0353088 | A1* | 12/2015 | Ishikawa | G05D 1/0061 |
| | | | | 701/23 |
| 2016/0033964 | A1 | 2/2016 | Sato et al. | |
| 2018/0288182 | A1* | 10/2018 | Tong | B60R 1/00 |
| 2019/0304309 | A1* | 10/2019 | Sakamoto | B60W 50/14 |

FOREIGN PATENT DOCUMENTS

| | | |
|---|---|---|
| DE | 102009060391 A1 | 6/2011 |
| DE | 102013110852 A1 | 4/2015 |
| DE | 102014009985 A1 | 1/2016 |
| JP | 2014-108771 A * | 12/2012 |
| JP | 2014-108771 A | 6/2014 |
| JP | 2015-230573 A | 12/2015 |
| JP | 2016-034782 A | 3/2016 |
| JP | 2017-013605 A | 1/2017 |

OTHER PUBLICATIONS

Supplementary European Search Report dated Nov. 8, 2019, issued in corresponding European Patent Application No. 17774153.5.
International Search Report issued in corresponding International Patent Application No. PCT/JP2017/009388, dated Jun. 6, 2017, with English Translation.

* cited by examiner

[Fig.1]
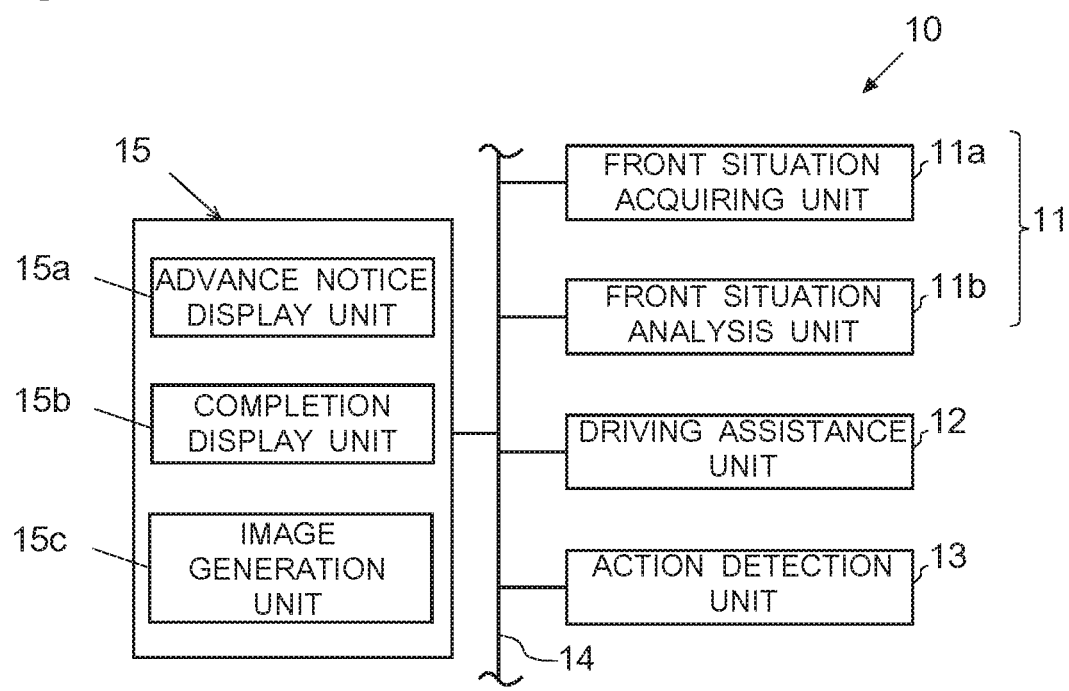

[Fig.2]
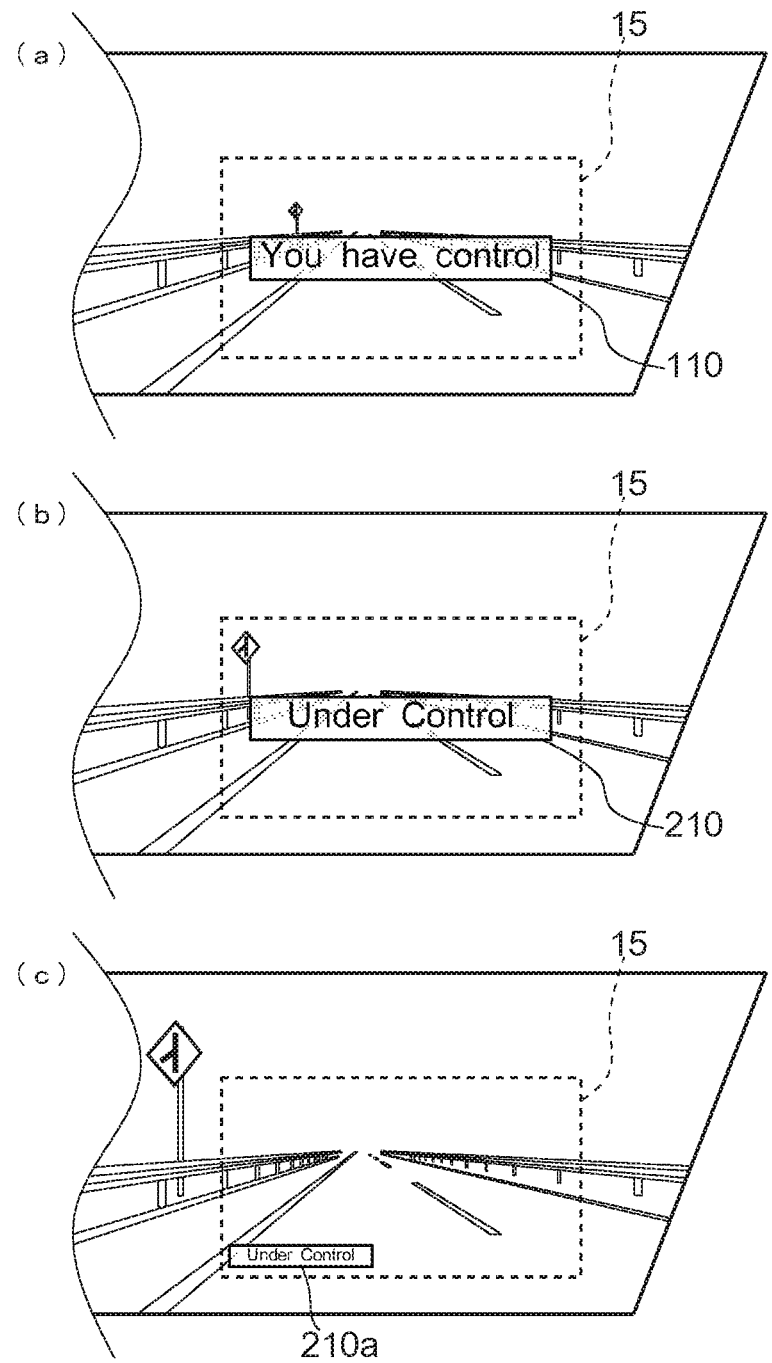

[Fig.3]

(a) Handle operation will be switched to manual. —120

(b) Handle operation has been switched to manual. —220

[Fig.4]

(a) Handle operation will be switched to manual. —120

(b) Switching to manual handle operation. —310

(c) Switching to manual handle operation. —310

(d) Handle operation has been switched to manual. —220

[Fig.5]
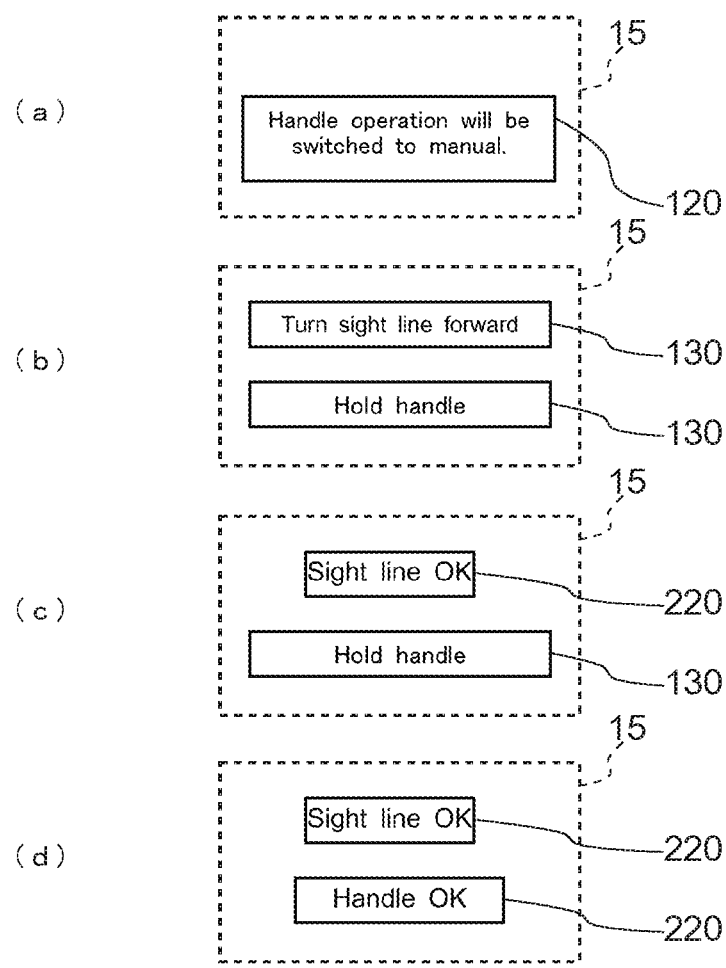

[Fig.6]
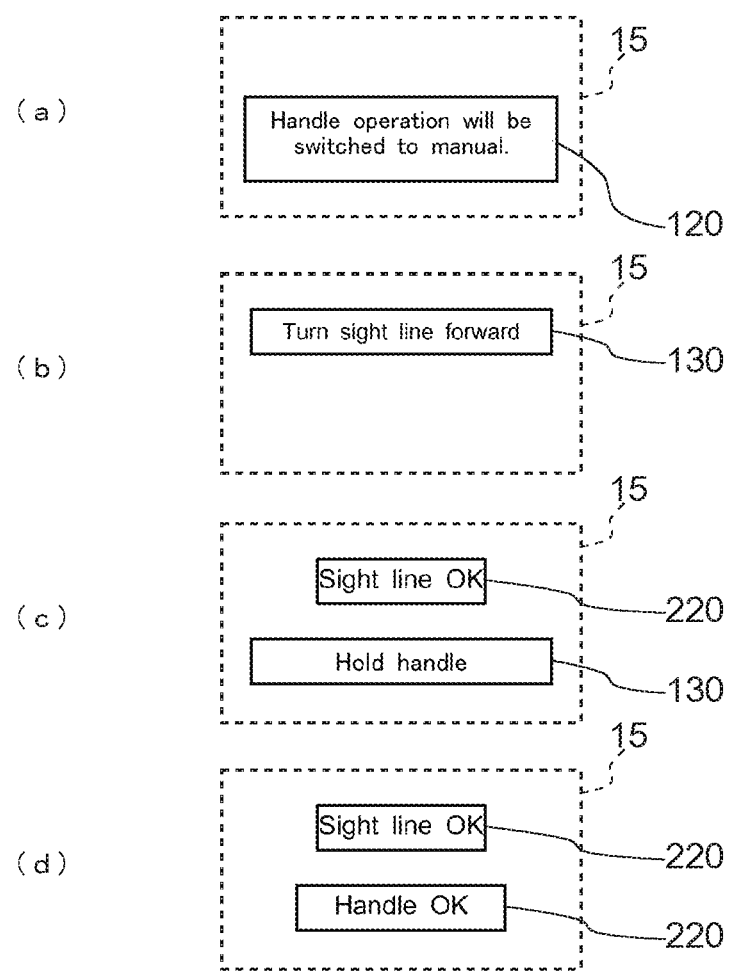

[Fig.7]
(a) 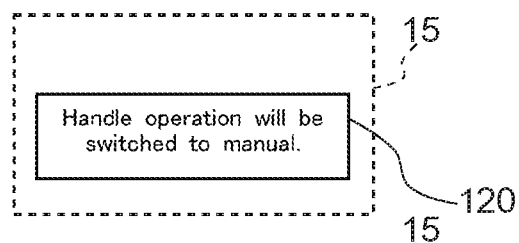
(b) 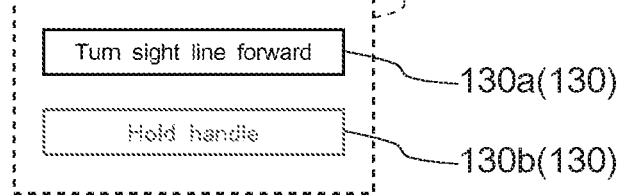
(c) 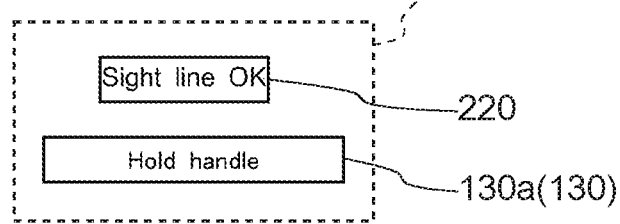
(d) 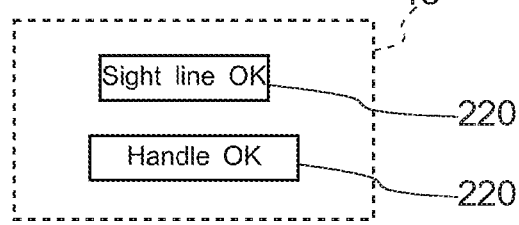

[Fig.8]
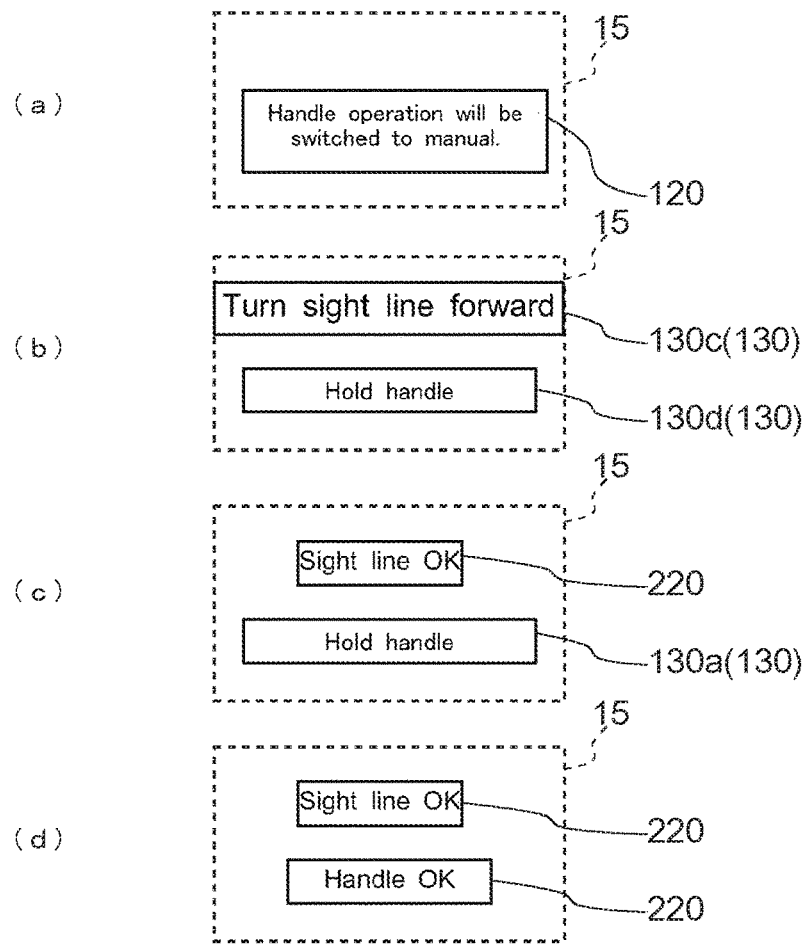
[Fig.9]
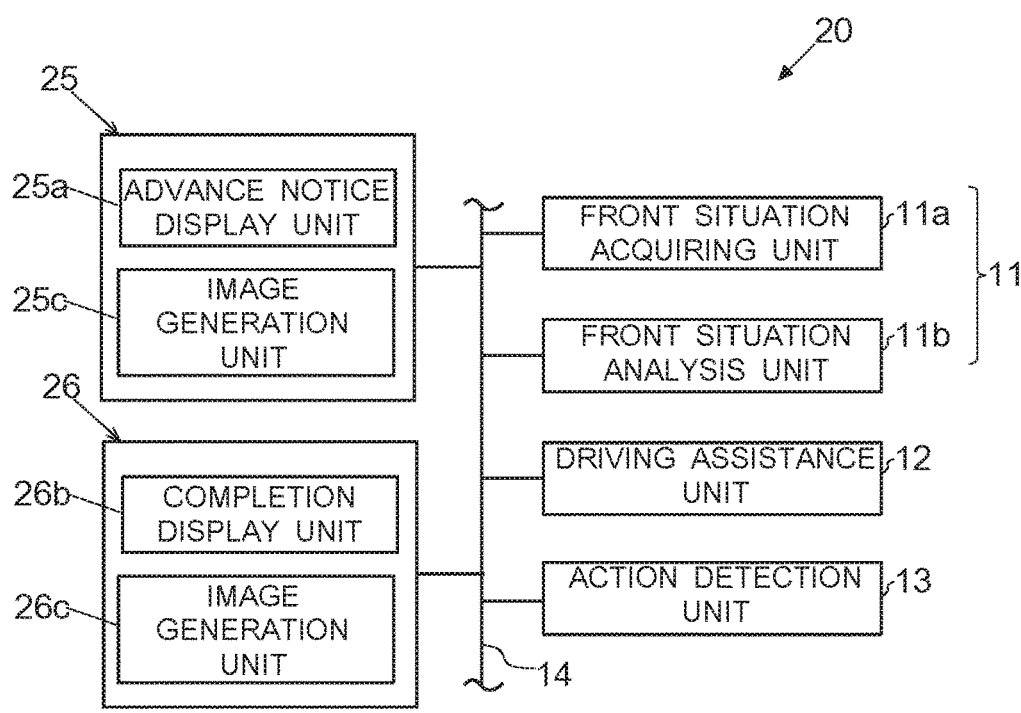

[Fig.10]
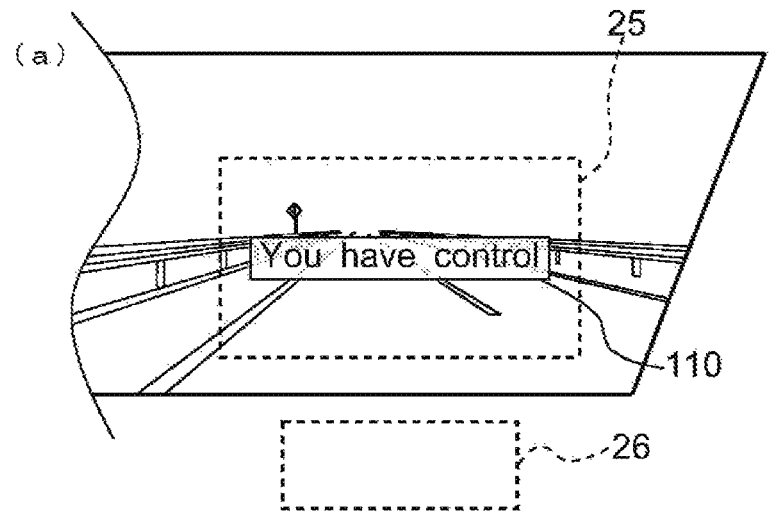
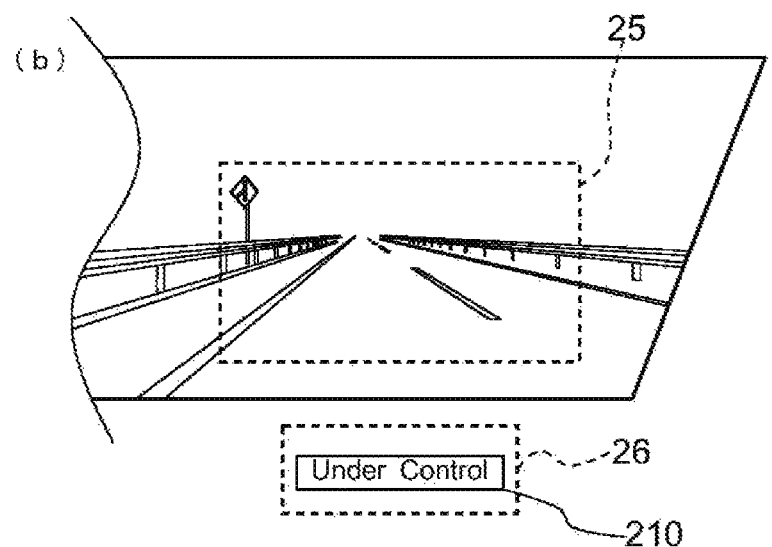
[Fig.11]

DRIVING ASSISTANCE SYSTEM AND DISPLAY DEVICE

CROSS REFERENCE

This application is the U.S. National Phase under 35 U.S.C. § 371 of International Application No. PCT/JP2017/009388, filed on Mar. 9, 2017, which claims the benefit of Japanese Application No. 2016-063060, filed on Mar. 28, 2016, the entire contents of each are hereby incorporated by reference.

TECHNICAL FIELD

The present invention relates to a driving assistance system that assists in driving a vehicle and a display device used for the driving assistance system.

BACKGROUND ART

In the driving assistance system described in Patent Literature 1, when a driving mode of a vehicle is switched from an automatic driving mode to a manual driving mode, advance notice of disabling of automatic driving is given to a driver for the purpose of prompting the driver to prepare for manual driving.

CITATION LIST

Patent Literature

Patent Literature 1: Japanese Unexamined Patent Application Publication No. 2015-230573

SUMMARY OF THE INVENTION

Problems to be Solved by the Invention

In the driving assistance system described in Patent Literature 1, however, only advance notice of shifting of automatic driving to manual driving (disabling of driving assistance) is given to a driver. Consequently, there is a problem that the driver is difficult to recognize a timing when the driving assistance is disabled or a timing when the driving assistance has just been disabled.

An object of the present invention is to provide a driving assistance system and a display device that can contribute to safe vehicle driving by enabling easy recognition of a timing when driving assistance is switched.

Means for Solving the Problems

In order to achieve the above-described object, a driving assistance system according to the present invention includes a driving assistance determination unit (11) that detects a front situation of a host vehicle to determine, based on the front situation, whether driving assistance of the host vehicle is disabled, a driving assistance unit (12) that disables the driving assistance of the host vehicle based on a determination made by the driving assistance determination unit, an advance notice display unit (15, 25) that displays an advance notice image (110, 120, 130) for giving advance notice of disabling of the driving assistance in advance when the driving assistance unit disables the driving assistance, and an action detection unit (13) that detects an action of a driver of the host vehicle. When the action detected by the action detection unit (13) is a disabling action required to disable the driving assistance, the driving assistance unit (12) disables the driving assistance of the host vehicle. The driving assistance system further includes a completion display unit (15, 26) that displays a completion image (210, 220) for informing a driver of completion of disabling of the driving assistance or completion of the disabling action.

In addition, a display device according to the present invention includes a driving assistance information acquiring unit (15c) that acquires information about driving assistance of a host vehicle to be disabled, an advance notice display unit (15a) that displays an advance notice image (110, 120, 130) for giving advance notice of disabling of the driving assistance in advance based on information acquired by the driving assistance information acquiring unit, a completion information acquiring unit (15c) that acquires information about detection of a disabling action required to disable the driving assistance and/or about completion of disabling of the driving assistance, and a completion display unit (15b) that displays a completion image (210, 220) for informing a driver of completion of disabling of the driving assistance or completion of the disabling action based on information acquired by the completion information acquiring unit.

Effect of the Invention

The present invention can contribute to safe driving by enabling easy recognition of a timing when driving assistance is switched.

BRIEF DESCRIPTION OF THE DRAWINGS

FIG. 1 is a block diagram of a configuration of a driving assistance system according to a first embodiment of the present invention.

FIG. 2 show display examples of an advance notice image and a completion image displayed on a first display unit according to the first embodiment.

FIG. 3 show modified display examples of an advance notice image and a completion image displayed on the first display unit according to the first embodiment.

FIG. 4 show another modified display examples of an advance notice image and a completion image displayed on the first display unit according to the first embodiment.

FIG. 5 show still another modified display examples of an advance notice image and a completion image displayed on the first display unit according to the first embodiment.

FIG. 6 show still another modified display examples of an advance notice image and a completion image displayed on the first display unit according to the first embodiment.

FIG. 7 show still another modified display examples of an advance notice image and a completion image displayed on the first display unit according to the first embodiment.

FIG. 8 show still another modified display examples of an advance notice image and a completion image displayed on the first display unit according to the first embodiment.

FIG. 9 is a block diagram of a configuration of a driving assistance system according to a second embodiment of the present invention.

FIG. 10 show display examples of an advance notice image and a completion image displayed on a first display unit according to the second embodiment.

FIG. 11 shows a display example of the first display unit according to a modification of the present invention.

MODE FOR CARRYING OUT THE INVENTION

A first embodiment of a driving assistance system 10 according to the present invention will be described with reference to FIGS. 1 to 8.

First Embodiment

FIG. 1 is a block diagram of a configuration of the driving assistance system 10 according to the first embodiment of the present invention.

The driving assistance system 10 according to the first embodiment includes, as shown in FIG. 1, a driving assistance determination unit 11, a driving assistance unit 12, a first display unit (display device) 15, and an action detection unit 13. The driving assistance determination unit 11 detects a front situation of a host vehicle and determines whether driving assistance of the host vehicle is disabled based on the front situation. The driving assistance unit 12 disables the driving assistance of the host vehicle based on a determination made by the driving assistance determination unit 11. The first display unit 15 displays, when the driving assistance unit 12 disables the driving assistance, an advance notice image 110 for giving advance notice of the disabling of the driving assistance in advance and a completion image 210 for informing a driver E of completion of disabling of an item for the driving assistance or completion of a disabling action. The action detection unit 13 detects an action of the driver E of the host vehicle.

The driving assistance determination unit 11 determines whether driving assistance is disabled based on the front situation of the host vehicle. The driving assistance determination unit 11 according to the present embodiment is constituted by a front situation acquiring unit 11a that acquires the front situation of the host vehicle and a front situation analysis unit 11b that analyzes the front situation acquired by the front situation acquiring unit 11a to determine whether the driving assistance is disabled. For example, the front situation acquiring unit 11a is configured by a navigation system including lane information about a lane in which the host vehicle travels or the like. The front situation analysis unit 11b determines whether driving assistance needs to be disabled based on the lane information. There may be two or more types of items for driving assistance performed by the driving assistance unit 12 to be described later. In this case, the driving assistance determination unit 11 selects an item for driving assistance to be disabled based on the front situation of the host vehicle.

The front situation acquiring unit 11a may be configured by a communication device communicating with an external server, infrastructure, and the like. The front situation acquiring unit 11a may perform external communication to acquire the lane information, current lane information including the current situation of lanes, traffic regulation information, and the like. In addition, the front situation acquiring unit 11a may detect a situation near the host vehicle and may be configured by, for example, a camera (a visible camera or an infrared camera), a sonar, an ultrasonic sensor, or a millimeter-wave radar, which is mounted in the host vehicle, or the like. In this case, the front situation analysis unit 11b analyzes the situation near the host vehicle (for example, analyzes a captured image captured by the camera) to determine whether the driving assistance is disabled.

The driving assistance unit 12 is configured by an ECU (Electronic Control Unit) mounted in the host vehicle and performs the driving assistance of the host vehicle. The driving assistance unit 12 determines whether an action detected by the action detection unit 13 to be described later is a disabling action required to disable the driving assistance. When the action detected by the action detection unit 13 is the disabling action, the driving assistance unit 12 disables predetermined driving assistance determined by the driving assistance determination unit 11 to be necessary to be disabled. In addition, the driving assistance unit 12 may include one or more types of items for driving assistance for the purpose of the driving assistance of the host vehicle, and the disabling action may be different for each of the items for driving assistance. In the items for driving assistance, there may be those that do not require the disabling action. The driving assistance unit 12 may make two or more types of disabling actions correspond to one item for driving assistance and perform all of the two or more types of disabling actions, thus disabling the driving assistance of the corresponding items for driving assistance. Alternatively, the driving assistance unit 12 may make two or more types of disabling actions correspond to one item for driving assistance and perform one of the two or more types of disabling actions, thus disabling the driving assistance of the corresponding item for driving assistance.

Examples of the items for driving assistance include lane keeping assist (steering wheel operation assist) that supports steering to keep the relationship between a lane and the host vehicle, inter-vehicle distance control that controls driving-braking force of the host vehicle to keep a constant distance between the host vehicle and a vehicle in front or to keep a constant vehicle speed set in advance, parking assist that controls the steering and driving-braking force of the host vehicle to achieve automatic parking, lane change assist that controls the steering and driving-braking force of the host vehicle to automatically change lanes, merging and separation assist that controls the steering and/or driving-braking force of the host vehicle at a lane merging/separation point to enable smooth merging or separation of the host vehicle, turn right and left assist that, when the host vehicle is going to turn right or left at an intersection at an inappropriate timing, outputs a warning or controls the steering and/or driving-braking force of the host vehicle to cause the host vehicle to appropriately turn right or left, automatic starting and stopping assist that controls the driving-braking force of the host vehicle to automatically start or stop the host vehicle, inter-vehicle distance control that keeps a constant distance between the host vehicle and a vehicle in front or that keeps a constant vehicle speed set in advance, and obstacle damage reduction/avoidance assist that, when it is highly possible that the host vehicle will collide with an obstacle in a traveling direction, outputs a warning or controls the steering and/or braking force of the host vehicle to avoid a collision of the host vehicle with the obstacle.

The action detection unit 13 detects an action of the driver E to output information about the action to the driving assistance unit 12. Examples of the action detected by the action detection unit 13 include holding of a steering wheel, steering of a steering wheel, an action of putting a foot on an accelerator pedal or a brake pedal, an operation of an accelerator pedal or a brake pedal, an action of directing a driver's line of sight to a predetermined direction, an action of directing a driver's line of sight to a predetermined position, an operation of a predetermined switch, a gesture operation, an action of speaking a predetermined language, and a seat adjustment. That is, the action detection unit 13 may function as a line-of-sight detection unit that detects the direction of a line of sight of the driver E or detects a position where the line of sight is directed. Specifically, when the action detection unit 13 functions as the line-of-sight detection unit, the action detection unit 13 is also capable of detecting whether the line of sight of the driver E is directed to an advance notice image (110, 120, 130).

The first display unit (display device) 15 is configured by, for example, a head-up display that displays a virtual image (an image) in front of the driver E. The first display unit 15 according to the first embodiment displays at least the advance notice image (110, 120, 130) for giving advance notice of disabling of driving assistance in advance when the driving assistance unit 12 disables the driving assistance and a completion image (210, 220) for informing the driver E of completion of the disabling of the driving assistance or completion of a specific disabling action of the driver E. That is, the first display unit 15 according to the first embodiment includes a function of an advance notice display unit 15a that displays the advance notice image (110, 120, 130) and a function of a completion display unit 15b that displays the completion image (210, 220), which are described in the claims of the present invention. The first display unit 15 includes an image generation unit 15c that generates image data of the advance notice image (110, 120, 130) and the completion image (210, 220). The image generation unit 15c includes an interface (not shown) capable of transmitting and receiving information to and from the driving assistance determination unit 11, the driving assistance unit 12, the action detection unit 13, and the like. Information about driving assistance (an item for driving assistance) to be disabled, which is determined by the driving assistance determination unit 11, is input to the image generation unit 15c. Based on the information, the image generation unit 15c generates the image data of the advance notice image (110, 120, 130). In addition, information about detection of the disabling action and/or about completion of disabling of driving assistance is input from the action detection unit 13 or the driving assistance unit 12 to the image generation unit. Based on the information, the image generation unit 15c generates the image data of the completion image (210, 220). That is, the interface of the image generation unit 15c also functions as a driving assistance information acquiring unit that acquires information about driving assistance of the host vehicle to be disabled and a completion information acquiring unit that acquires information about detection of a disabling action required to disable the driving assistance and/or about completion of disabling of the driving assistance, which are described in the claims of the present invention. All or a part of the functions of the image generation unit 15c may be provided outside of the first display unit 15.

Display examples of the advance notice image (110, 120, 130) and the completion image (210, 220) for informing the driver E of completion of disabling of driving assistance or completion of a specific disabling action of the driver E, which are displayed on the first display unit 15, are described below with reference to FIGS. 2 to 8. With reference to FIGS. 2 to 8, the elapse of time is represented in alphabetical order such as (a), (b), .... Rectangular areas denoted by the reference numeral 15 in these drawings schematically show a display area in the first display unit 15.

FIG. 2 show display examples of the advance notice image 110 and the completion image 210 displayed on the first display unit 15 according to the first embodiment.

The advance notice image 110 shown in FIG. 2(*a*) is displayed on the first display unit 15 in a timing when the driving assistance determination unit 11 determines that predetermined driving assistance is disabled, for the purpose of informing the driver E that the predetermined driving assistance is going to be disabled, and the advance notice image 110 is, for example, a text image such as "You have control". The driver E visually checks the advance notice image 110 and thus can recognize the disabling of the driving assistance in advance and perform a predetermined disabling action required to unlock the driving assistance. When the action detection unit 13 detects the disabling action of the driver E, the driving assistance unit 12 disables target driving assistance. The first display unit 15 displays, as shown in FIG. 2(*b*), the completion image 210 on the first display unit 15. The completion image 210 is used for informing the driver E of completion of the disabling of driving assistance and is, for example, a text image such as "Under Control". The driver E visually checks the completion image 210 and thus can recognize a timing when the driving assistance has just been disabled. In addition, after displaying the completion image 210, the first display unit 15 displays, as shown in FIG. 2(*c*), a reduced completion image 210a, which is smaller than the completion image 210, for informing the driver E of the disabling of the driving assistance. The driver E can thus check whether the driving assistance is disabled.

FIG. 3 show display examples of the advance notice image 120 and the completion image 220 displayed on the first display unit 15 according to the first embodiment.

The advance notice image 120 shown FIG. 3(*a*) is displayed on the first display unit 15 in a timing when the driving assistance determination unit 11 determines that driving assistance of a specific item for driving assistance is disabled, for the purpose of informing the driver E which driving assistance of an item for driving assistance is going to be disabled, and the advance notice image 120 is, for example, a text image that specifically informs the driver E of the item for driving assistance to be disabled (a handle operation), such as "Handle operation will be switched to manual.". The driver E visually checks the advance notice image 120 and thus can recognize which driving assistance of an item for driving assistance is going to be disabled in advance and perform a predetermined disabling action required to unlock the driving assistance. When the action detection unit 13 detects the disabling action of the driver E, the driving assistance unit 12 disables target driving assistance. The first display unit 15 displays, as shown in FIG. 3(*b*), the completion image 220 on the first display unit 15. The completion image 220 is used for informing the driver E of the item for driving assistance, which has been disabled, and is, for example, a text image such as "Handle operation has been switched to manual". The driver E visually checks the completion image 210 and thus can specifically recognize the item for driving assistance disabled and a timing when the driving assistance has just been disabled.

FIG. 4 show display examples of the advance notice image 120, the completion image 220, and an in-progress image 310 displayed on the first display unit 15 according to the first embodiment.

FIG. 4 show an example of displaying the in-progress image 310 for informing the driver E more precisely of the timing when driving assistance is disabled. The driver E visually checks the advance notice image 120 shown in FIG. 4(*a*) and thus can recognize which driving assistance of an item for driving assistance is going to be disabled in advance and perform a predetermined disabling action (holding of a steering wheel) required to unlock the driving assistance. When the action detection unit 13 detects the disabling action of the driver E, the first display unit 15 displays the in-progress image 310, from which the time required before disabling of the driving assistance can be estimated as shown in FIGS. 4(b) and 4(c). The in-progress image 310 is, for example, an image of a bar graph changing based on the time elapsed since the action detection unit 13 has detected the disabling action and the time during which the disabling action detected by the action detection unit 13 is performed. The driver E visually checks the in-progress image 310 and thus can recognize more accurately the timing when the driving assistance has just been disabled.

FIG. 5 show display examples of the advance notice image 130 and the completion image 220 displayed on the first display unit 15 according to the first embodiment.

FIG. 5 show an example in which the advance notice image 130 displays a disabling action of disabling driving assistance.

The advance notice image 120 shown in FIG. 5(a) informs the driver E which driving assistance of an item for driving assistance is going to be disabled in a timing when the driving assistance determination unit 11 determines that driving assistance of a specific item for driving assistance is disabled. As shown in FIG. 5(b), the first display unit 15 then displays the advance notice image 130 that shows a specific disabling action of disabling the driving assistance. When there are two or more types of disabling actions of disabling the driving assistance, as shown in FIG. 5(b), these actions may be simultaneously displayed in parallel or each of these actions may be displayed at a time. The driver E visually checks the advance notice image 130 showing the specific disabling action and thus can recognize an action specifically required to unlock the driving assistance and reliably perform the predetermined disabling action required to unlock the driving assistance. When the action detection unit 13 detects the disabling action of the driver E, the driving assistance unit 12 switches the advance notice image 130 showing the detected disabling action to the completion image 220 showing completion of the disabling action. As described above, the advance notice images 130 specifically showing two or more types of the disabling actions of disabling the item for driving assistance are displayed in parallel and the advance notice image 130 showing the disabling action completed is switched to the completion image 220 showing the completion of the disabling action, so that it is possible to immediately inform the driver E of completion/incompletion of a plurality of disabling actions.

FIGS. 6, 7, and 8 show cases where there are two or more types of disabling actions of disabling an item for driving assistance, these disabling actions are prioritized, and the advance notice images 130 showing the respective disabling actions are displayed on the first display unit 15 based on the priority order.

In display examples of FIG. 6, the first display unit 15 displays first the advance notice image 130 showing a disabling action with higher priority, as shown in FIG. 6(b). After the disabling action with higher priority is completed, the first display unit 15 then displays the advance notice image 130 showing a disabling action with lower priority, as shown in FIG. 6(c).

In display examples of FIG. 7, the first display unit 15 displays an advance notice image 130a, showing a disabling action with higher priority, with high visibility (brightness) as shown in FIG. 7(b) and an advance notice image 130b, showing a disabling action with lower priority, with low visibility (brightness).

In display examples of FIG. 8, the first display unit 15 displays an advance notice image 130c showing a disabling action with higher priority with large characters for the purpose of achieving high visibility, and an advance notice image 130d showing a disabling action with lower priority with small characters for the purpose of achieving low visibility, as shown in FIG. 8(b). In addition, examples of the method of achieving different visibilities of the advance notice image 130 include a method of using different display colors. One advance notice image 130 may be displayed in a warm color such as red to achieve high visibility (recognition) whereas another advance notice image 130 may be displayed in a cold color such as blue to achieve low visibility (recognition).

The driving assistance system 10 according to the first embodiment of the present invention has been described above. A driving assistance system 20 according to a second embodiment of the present invention will be described below with reference to FIGS. 9 and 10.

Second Embodiment

FIG. 9 is a block diagram of the driving assistance system 20 according to the second embodiment of the present invention. The second embodiment is different from the first embodiment in the following point. That is, the advance notice image 110, 120, and 130 for giving advance notice of disabling of driving assistance in advance and the completion image 210, 220 for informing a driver of completion of the disabling of the driving assistance or completion of a disabling action are displayed on the common first display unit 15 in the first embodiment. Meanwhile, in the driving assistance system 20 according to the second embodiment, a first display unit 25 includes a function of an advance notice display unit 25a displaying the advance notice image 110, 120, 130 and a second display unit 26, which is different from the first display unit 25, includes a function of a completion display unit 26b displaying the completion image 210, 220. Except for this point, the second embodiment is the same as the first embodiment and thus the same configurations are denoted by the same reference numerals and detailed descriptions thereof will be omitted.

For example, the first display unit 25 according to the second embodiment is configured by a head-up display that displays a virtual image (an image) in front of the driver E. The first display unit 25 according to the second embodiment displays at least the advance notice image (110, 120, 130) for giving advance notice of disabling of driving assistance in advance when the driving assistance unit 12 disables the driving assistance. That is, the first display unit 25 according to the first embodiment includes a function of the advance notice display unit 25a described in the claims of the present invention. In addition, the first display unit 25 includes an image generation unit 25c that generates image data of the advance notice image (110, 120, 130). The image generation unit 25c has an interface (not shown) capable of transmitting and receiving information to and from the driving assistance determination unit 11, the driving assistance unit 12, and the like. Information about driving assistance (an item for driving assistance) to be disabled, which is determined by the driving assistance determination unit 11, is input to the image generation unit 25c. Based on the information, the image generation unit 25c generates the image data of the advance notice image (110, 120, 130). All or a part of the functions of the image generation unit 25c may be provided outside of the first display unit 25.

The second display unit 26 according to the second embodiment is configured by, for example, a meter mounted in an instrument panel. The second display unit 26 according to the second embodiment displays at least the completion image (210, 220) for informing the driver E of completion of disabling of driving assistance or completion of a specific disabling action of the driver E when the driving assistance unit 12 disables the driving assistance. That is, the second display unit 26 according to the second embodiment includes a function of the completion display unit 26*b* described in the claims of the present invention. In addition, the second display unit 26 includes an image generation unit 26*c* that generates image data of the completion image (210, 220). The image generation unit 26*c* has an interface (not shown) capable of transmitting and receiving information to and from the driving assistance unit 12, the action detection unit 13, and the like. Information about detection of the disabling action and/or about completion of disabling of the driving assistance is input from the action detection unit 13 or the driving assistance unit 12 to the image generation unit 26*c*. Based on the information, the image generation unit 26*c* generates the image data of the completion image (210, 220). All or a part of the functions of the image generation unit 26*c* may be provided outside of the second display unit 26. The image generation unit 25*c* of the first display unit 25 and the image generation unit 26*c* of the second display unit 26 may be commonalized.

The first display unit 25 displays the advance notice image 110 for informing the driver E that predetermined driving assistance is going to be disabled in a timing when the driving assistance determination unit 11 determines that the predetermined driving assistance is disabled. The driver E visually checks the advance notice image 110 and thus can recognize the disabling of the driving assistance in advance and perform a predetermined disabling action required to unlock the driving assistance. When the action detection unit 13 detects the disabling action of the driver E, the driving assistance unit 12 disables target driving assistance and the second display unit 26 displays the completion image 210 on a second display unit 16 as shown in FIG. 10(*b*). At this time, the first display unit 25 causes the advance notice image 110 having been displayed to be undisplayed or reduces the visibility of the advance notice image 110. As the advance notice image 110 is displayed in an area overlapping a lane (the first display unit 25) as described above, the driver E can reliably recognize the advance notice image 110. Moreover, when the driving assistance is disabled, the advance notice image 110 displayed in the first display unit 25 is caused to be undisplayed or the visibility of the advance notice image 110 is reduced, so that good front visibility can be provided to the driver E. Additionally, as the completion image 210 is displayed in an area not overlapping the lane (the second display unit 26), the driver E can recognize the disabling of the driving assistance.

Other Embodiments

While the embodiments of the present invention have been described, the present invention is not limited to the embodiments and may be implemented in various modes without departing from the spirit of the present invention.

In the embodiments described above, the driving assistance determination unit 11 includes the front situation acquiring unit 11*a* that acquires a front situation of a host vehicle and the front situation analysis unit 11*b* that analyzes the front situation acquired by the front situation acquiring unit 11*a* to determine whether the driving assistance is disabled. However, the front situation analysis unit 11*b* may be included in the driving assistance unit 12 that performs the driving assistance of the host vehicle, the first display unit 15, 25, or the second display unit 26 as a part thereof.

While the first display unit 15 (the first display unit 25) is a head-up display in the embodiments described above, the first display unit 15 may be a head mounted display, a meter mounted in an instrument panel of a host vehicle, or other display devices.

While the advance notice image 110, 120, 130 and the completion image 210, 220 are mainly text images in the embodiments described above, the advance notice image 110, 120, 130 and the completion image 210, 220 may be graphics, illustrations, or pictures, which may be still or in motion.

The first display unit 15 configured by a head-up display in the embodiments described above may display the advance notice image 110 and the completion image 210 with an equal distance from the driver E or with different distances from the driver E. Specifically, as shown in FIG. 11, the first display unit 15 according to the embodiments described above may display the advance notice image 110 far from the driver E and the completion image 210 near the driver E. As the completion image 210 is displayed to be closer to the driver E than the advance notice image 110, when the driver E looks forward while travelling on a road in usual cases, the driver E easily focuses on the advance notice image 110 with high priority and thus the advance notice image 110 is highly recognizable. On the other hand, the driver E is difficult to focus on the completion image 210 with low priority and thus the completion image 210 is less recognizable and does not hinder driving.

The first display unit 15, 25 may change a mode of displaying the advance notice image (110, 120, 130) based on one of the distance from a predetermined position of a host vehicle, the traveling distance of the host vehicle, and the time elapsed. Specifically, examples of the distance from the predetermined position of the host vehicle include the distance from a position where the driving assistance determination unit 11 determines disabling of predetermined driving assistance and the remaining distance to a position where the driving assistance unit 12 desirably disables driving assistance. A specific example of the traveling distance of the host vehicle includes the traveling distance of the host vehicle from the position where the driving assistance determination unit 11 determines disabling of predetermined driving assistance. Specific examples of the time elapsed include the time elapsed since the driving assistance determination unit 11 determines disabling of the predetermined driving assistance and the remaining time of the time limit during which the driving assistance unit 12 desirably disables driving assistance. As the change in the display mode, the first display unit 15, 25 gradually increases the visibility of the advance notice image (110, 120, 130). Specifically, the first display unit 15, 25, for example, gradually increases the size of the advance notice image (110, 120, 130) or the brightness of the advance notice image (110, 120, 130), and causes a display color to be gradually close to a warning color such as changing green, amber, and red.

INDUSTRIAL APPLICABILITY

The present invention is applicable to a driving assistance system that assists a driver in driving a vehicle and to a display device incorporated in a vehicle including the driving assistance system.

DESCRIPTION OF REFERENCE NUMERALS

10, 20: Driving assistance system
11: Driving assistance determination unit
11*a*: Front situation acquiring unit 11b: Front situation analysis unit
12: Driving assistance unit
13: Action detection unit
15, 25: First display unit
16, 26: Second display unit
15a, 25a: Advance notice display unit
15b, 26b: Completion display unit
15c, 25c, 26c: Image generation unit
110, 120, 130: Advance notice image
210, 220: Completion image
310: In progress image
E: Driver

The invention claimed is:

1. A driving assistance system comprising:
a driving assistance determination unit that detects a front situation of a host vehicle to determine, based on the front situation, whether driving assistance of the host vehicle is disabled;
a driving assistance unit that disables the driving assistance of the host vehicle based on a determination made by the driving assistance determination unit;
an advance notice display unit that displays a first image indicating a first disabling action for disabling the driving assistance and a second image indicating a second disabling action for disabling the driving assistance when the driving assistance unit disables the driving assistance, wherein the first image and the second image are displayed in parallel with each other; and
an action detection unit that detects one or more actions of a driver of the host vehicle,
wherein when the one or more actions detected by the action detection unit are the first disabling action and the second disabling action required to disable the driving assistance, the driving assistance unit disables the driving assistance of the host vehicle, and
wherein the driving assistance system comprising a completion display unit that displays a first completion image for informing the driver of completion of the first disabling action and a second completion image for informing the driver of completion of the second disabling action,
wherein the action detection unit includes a line-of-sight detection unit that detects a direction of a line of sight of the driver,
wherein the first disabling action is performed on a condition that the line of sight of the driver detected by the line-of-sight detection unit is directed to the first image,
wherein the second disabling action is performed on a condition that the line of sight of the driver detected by the line-of-sight detection unit is directed to the second image, and
wherein display modes of the first image and the second image change based on at least one of a distance from a predetermined position of the host vehicle, a traveling distance of the host vehicle, and a time elapsed.

2. The driving assistance system according to claim 1, wherein
the driving assistance unit performs the driving assistance of the host vehicle based on two or more types of items for the driving assistance, and
the driving assistance determination unit selects an item for the driving assistance to be disabled based on the front situation.

3. The driving assistance system according to claim 1, wherein when the one or more actions detected by the action detection unit are the first disabling action and the second disabling action, the completion display unit replaces 1) the first image with the first completion image such that the first completion image is being displayed in a display area where the first image is displayed and 2) the second image with the second completion image such that the second completion image is displayed in a display area where the second image is being displayed.

4. A display device comprising:
a driving assistance information acquiring unit that acquires information about driving assistance of a host vehicle to be disabled;
an advance notice display unit that displays a first image indicating a first disabling action for disabling the driving assistance and a second image indicating a second disabling action for disabling the driving assistance when disabling the driving assistance based on information acquired by the driving assistance information acquiring unit, wherein the first image and the second image are displayed in parallel with each other;
a completion information acquiring unit that acquires information about detection of the first disabling action and the second disabling action required to disable the driving assistance and/or about completion of disabling of the driving assistance;
a completion display unit that displays a first completion image for informing a driver of completion of the first disabling action based on information acquired by the completion information acquiring unit and a second completion image for informing the driver of completion of the second disabling action; and
a line-of-sight detection unit that detects a direction of a line of sight of the driver,
wherein the first disabling action is performed on a condition that the line of sight of the driver detected by the line-of-sight detection unit is directed to the first image,
wherein the second disabling action is performed on a condition that the line of sight of the driver detected by the line-of-sight detection unit is directed to the second image, and
wherein the completion display unit changes display modes of the first image and the second image change based on at least one of a distance from a predetermined position of the host vehicle, a traveling distance of the host vehicle, and a time elapsed.

5. The display device according to claim 4, wherein when the first disabling action is detected, the completion display unit replaces 1) the first image with the first completion image such that the first completion image is displayed in a display area where the first image is being displayed and 2) the second image with the second completion image such that the second completion image is displayed in a display area where the second image is being displayed.

* * * * *